United States Patent
Prestidge et al.

(10) Patent No.: US 7,970,488 B2
(45) Date of Patent: Jun. 28, 2011

(54) MACHINE TOOL WORKPIECE INSPECTION SYSTEM

(75) Inventors: Tim Prestidge, Bath (GB); John Charles Ould, Backwell Farleigh (GB); David Kenneth Thomas, Bristol (GB); Andrew James Harding, Bristol (GB)

(73) Assignee: Renishaw PLC, Wotton-under-Edge (GB)

( * ) Notice: Subject to any disclaimer, the term of this patent is extended or adjusted under 35 U.S.C. 154(b) by 356 days.

(21) Appl. No.: 10/583,353

(22) PCT Filed: Jan. 6, 2005

(86) PCT No.: PCT/GB2005/000023
§ 371 (c)(1),
(2), (4) Date: Jun. 19, 2006

(87) PCT Pub. No.: WO2005/065884
PCT Pub. Date: Jul. 21, 2005

(65) Prior Publication Data
US 2008/0051927 A1 Feb. 28, 2008

(30) Foreign Application Priority Data
Jan. 6, 2004 (GB) .................................. 0400144.2

(51) Int. Cl.
*G06F 19/00* (2006.01)
*G06F 11/30* (2006.01)
*G01B 5/004* (2006.01)

(52) U.S. Cl. .......... 700/195; 700/193; 33/503; 702/183; 73/1.01

(58) Field of Classification Search .................. None
See application file for complete search history.

(56) References Cited

U.S. PATENT DOCUMENTS

| 4,138,718 | A | * | 2/1979 | Toke et al. ........................ 700/7 |
| 4,811,253 | A | | 3/1989 | Johns |
| 4,885,836 | A | * | 12/1989 | Bonomi et al. .............. 29/524.1 |
| 4,974,165 | A | * | 11/1990 | Locke et al. .................. 700/193 |
| 5,428,548 | A | | 6/1995 | Pilborough et al. |

(Continued)

FOREIGN PATENT DOCUMENTS

JP A-05-208345 8/1993

(Continued)

OTHER PUBLICATIONS

"Control and Drive Systems Electronic Documentation system version 07," CD-ROM, Rexroth Indramat, XP002361192, pp. 111-112, retrieved on Dec. 29, 2005.

(Continued)

*Primary Examiner* — Ramesh B Patel
*Assistant Examiner* — Sunray R Chang
(74) *Attorney, Agent, or Firm* — Oliff & Berridge, PLC

(57) ABSTRACT

A workpiece inspection system is disclosed for determining measurements of a workpiece on a machine tool. The system utilizes a measurement device which outputs data relating to the workpiece (e.g. in place of a conventional cutter). The problem of obtaining real time data relating to the position of the machine tool is overcome by recording a machine tool position data set and a measurement device data set at selected instants which are defined by a synchronization signal. The data sets are combined later in the correct relative position because the synchronization signal was used. The synchronization signal can issue from the machine tool controller, an interface, measurement device or another part of the system.

17 Claims, 1 Drawing Sheet

U.S. PATENT DOCUMENTS

Figure 1:
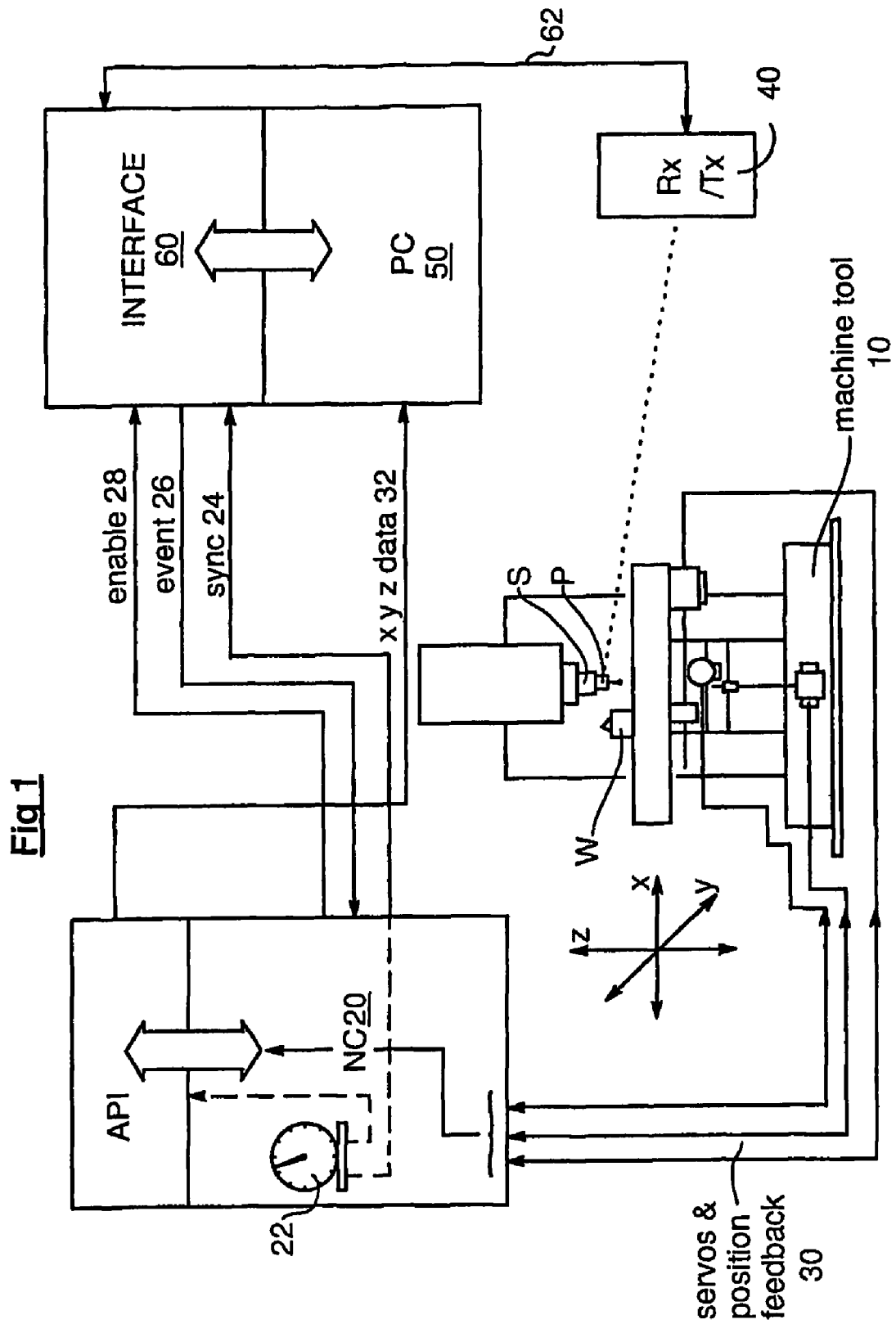

| | | | |
|---|---|---|---|
| 5,773,731 A | 6/1998 | Sakakura et al. | |
| 6,098,452 A | 8/2000 | Enomoto | |
| 6,519,860 B1 * | 2/2003 | Bieg et al. | 33/503 |
| 6,539,642 B1 * | 4/2003 | Moriyasu et al. | 33/551 |
| 6,668,466 B1 * | 12/2003 | Bieg et al. | 33/503 |
| 6,834,257 B2 * | 12/2004 | Keller | 702/183 |
| 2003/0061857 A1 * | 4/2003 | Keller | 73/1.01 |

FOREIGN PATENT DOCUMENTS

| | | |
|---|---|---|
| JP | A-07-210228 | 8/1995 |

OTHER PUBLICATIONS

Official Notice of rejection mailed Sep. 28, 2010 in Japanese Patent Application No. 2006-548379. (Translated).

\* cited by examiner

MACHINE TOOL WORKPIECE INSPECTION SYSTEM

This invention relates to a system for the inspection of workpieces or other artefacts. In particular the invention relates to a system employing a machine tool and to inspection by means of a measurement device such as a measurement probe, used on the machine tool.

Conventionally, a measurement probe is used on a machine tool in a so-called touch trigger mode i.e. moving the probe so as to touch an artefact and using a touch trigger signal. The signal is usually routed through an input of the machine tool's controller (NC) known as the skip line. This skip signal is a simple on/off signal that can be caused to interrupt the NC and to record the machine's position (x, y and z readings) at the instant the skip signal was issued. Thus data indicative of the probe's position can be obtained. Whilst this system is adequate for most purposes it relies on very repeatable probe system triggering and machine velocity control, and the NC is often not capable of any significant processing of the recorded position data.

If many data points are required, for example for determining the correctness of a contour, then the touch trigger process described above can be time consuming.

In U.S. Pat. No. 5,428,548 a probe is used to feel around the artefact on a machine tool. Inputs from a scanning probe are fed to a PC which instructs the machine tool's NC to move to another position. Each time the probe is moved and another set of data from the probe is taken, the PC has to wait until the machine tool has stopped before the probe data is logged. In this way a data set of probe measurements are produced which can be associated with assumed machine tool movements. There is no feedback to the PC to confirm the machine's position. The actual position of the machine tool is assumed to be correct following position instructions issued by the PC to the NC. There is a waiting period to give time for the machine to finish moving.

In a known commercial system by Lemoine Multinational Technologies, there is provided a path scanning system which provides part form data which is associated with a machine position. This known system appears to obtain its machine position data by tapping into the so-called servo control loop, which allows the controlling software to obtain tool position data. This position data together with probe data can be combined but there is no way of confirming that the two sets of data were truly taken at exactly the same time.

The present invention provides a workpiece inspection system comprising a machine tool which has a controller operable to perform a workpiece producing process and a workpiece inspection process, the inspection process including a method for synchronising varying data relating to measurements of the workpiece from a measurement device with varying data relating to machine position from the machine tool, comprising in any suitable order the steps of:
  mounting the measurement device on the machine tool;
  changing the position of the workpiece relative to the measurement device;
  causing measurements of the workpiece to be taken by the measurement device;
  issuing synchronisation signals defining a plurality of instants;
  recording a first set of the varying data relating to the position of the machine at least at some of the instants; and
  recording a second set of the varying data from the measurement device relating to measurements of the workpiece at least at some of the instants.

Preferably the synchronisation signal issues to or from a machine tool controller. The synchronisation signal may be used to identify the real time at which each of the members of the first and second sets of data of the machine tool and measurement device were recorded in order that the position data and the measurement data can be combined with the same real time.

Thus the invention further provides for the step of combining the first data set with the second data set such that each element of the two sets are associated with the same real time or synchronisation signal.

Preferably the method further provides the step of monitoring at regular intervals the measurement device. This may be done more frequently than the occurrences of the plurality of synchronisation signals. In this way only selected data may be recorded to the second set and/or the data may be manipulated prior to its recordal.

Preferably synchronisation signals are issued at a time related to the time that position data or measurement data is generated. The synchronisation signal may be used to label both measurement and position data generated at the time the synchronisation signal was issued. Alternatively, data may be collected at a time which is not at the instant of the synchronisation signal. If necessary the data can then be manipulated.

Alternatively the synchronisation signal may be issued from a source other than the machine tool control.

The present invention provides also other features defined by the claims.

The invention will now be described with reference to the drawing, wherein the FIGURE shows one embodiment of a measurement system according to the invention.

The FIGURE shows a machine tool 10 having a control device NC 20. The NC is used to control all functions of the machine tool. Shown in the drawing are servo control and position feedback lines 30. These lines are used to control x, y and z movements of the machine. A spindle S (in this instance fixed in position) can accept a measurement probe P. The probe is used to check the dimensions of workpiece W mounted to the machine tool as the workpiece is moved in x, y or z directions. The probe P is of a type which can produce varying data representing the deflection of its stylus in x, y or z and can produce many results per second. The stylus deflection data is transmitted wirelessly to a receiver/transmitter Rx/Tx 40. The NC 20 has position feedback lines which are also capable of receiving varying data relating to the x, y and z positions of the machine many times per second.

A PC 50 is provided which has an interface circuit 60 e.g. a PCI, PCMCIA, Ethernet or USB type. The interface is capable of receiving and buffering data from the Rx/Tx along line 62, relating to probe stylus deflections. In this embodiment line 62 also provides for sending probe instructions. The PC accepts data via line 32, relating to the positional machine tool movements. In the present embodiment the machine tool movements are directed straight to the PC, but they could be routed via interface 60.

The interface can be used to buffer data received from the probe (and from the NC if appropriate). The buffer can store the data to send to the PC later. The interface can also use immediately the data coming from the probe to monitor conditions which require action e.g. over-deflection of the probe stylus. In such an instance of over-deflection the interface could issue a signal immediately to stop or reverse the machine's movements. Machine position data gathered immediately before the stop can be used to facilitate such action.

Where the interface is in control of real time over-deflection etc monitoring, then it is possible that the PC can instruct the interface to alter conditions at which over-deflection etc is deemed to have occurred so that undesirable effects such as false triggering due to vibration or rapid movement of the probe are taken into account.

These two sets of data can be used by the PC to produce an accurate profile of the workpiece W. However, useful computation can be carried out only if the two sets of data can be combined. In order for this to happen the relative time at which sets of data were obtained must be known. In operation the NC collects data relating to the machine tool movement and tabulates that data in order according to a regular synchronisation signal from an internal clock 22.

The internal clock 22 produces the synchronisation signal 24 and the interface accepts this signal. A call for data from the probe is sent to the probe along path 62 in response to the synchronisation signal received at the interface 60. The interface too collects data relating to probe stylus deflection and the PC tabulates that data in order according to the synchronisation signal from the internal clock 22. In practice the PC can combine elements of the NC data with elements of the probe data because both are in the same order and will be in the same or related field of their respective tables.

The PC can thus carry out computation using the data from the same or related fields in each of the tabulated data from the NC and the probe.

Speed of transfer of data to the PC from the NC and interface is not significant to the measurement speed of this system. The speed of transfer of data to the PC from the NC and interface will be dependent on the data transfer rate and the size of the memory buffers in the NC and the interface.

Typically the system will operate in the following manner:
the NC will run a program e.g. a program for cutting a workpiece W;
the NC will run an inspection routine which includes the selection of the measurement probe P and the movement of the workpiece W past the probe along a nominal path defined by the inspection routine; and
during the routine both the position of the machine tool and the deflection of the stylus of the probe are recorded in the manner described above.

The PC can compute such things as workpiece size or form, workpiece surface finish and the assessment of scrap workpieces. Using such data it can also compute revised cutting tool paths and new feed and speed rates. In use of the system the two data sets are combined in the pc and used to determine the physical dimensions of a workpiece e.g. by adding or subtracting probe data to or from machine position data. This combined data can then be used to influence the further manufacturing of the workpiece or subsequently produced workpieces. This is done by altering the NC program or machine settings used to manufacture the workpiece.

If required the interface 60 can manipulate the data from the probe P so that, for example it is retarded or advanced to match the position data 32 from the machine tool. In this way repeatable delays from the NC or measurement device can be accommodated. It is also possible to collect more data from the measurement device or NC than the other. In an example the synchronisation signal is multiplied at interface 60 and many calls for data from the probe are sent to the probe along path 62. The calls for data occur at the multiplied rate. Thus data from the probe will be more numerous than the data from the NC. Measurement device data can be collected at say 10 times the rate of the NC position data so that filtering of the measurement device data can occur in the PC, resulting in better accuracy of measurement.

To avoid breakage of the probe, one or more event signals may be incorporated into the interface circuit. Should conditions occur for example deflection of the stylus greater than a threshold then the event signals are sent to the NC along line(s) 26. Such a signal will stop the machine via a conventional skip signal so that the unexpected problem can be overcome.

The measurement device and the interface may have multiple operating modes and these modes may be selected via signals sent to the interface, from the PC or from the NC e.g. the enable signal 28 starts the data collection from the measurement probe. In practice the synchronisation signal 24 runs continuously but data from the probe and/or NC are recorded only when the enable signal 28 is activated. Then enable signal is activated by commands within the NC program.

Many variants will be apparent to the skilled addressee. The separate NC and PC illustrated these may be integral. The measurement device illustrated is a measurement probe but other measurement devices can be used e.g. cameras or thermometers. The measurement device need not have wireless communication. A hard-wired arrangement is possible. The probe used is capable of generating a stream of deflection data. The probe could also be used in a touch trigger mode i.e. a predetermined stylus deflection causes just one trigger signal. Such a mode of operation may be useful e.g. when initially setting up a workpiece, when the size of the part is not known exactly. A skip signal (like the event signal described) can be used as a touch trigger signal. The x, y, z position data 32 shown might be replaced or supplemented by non Cartesian data and could be fed into the interface rather than into the PC as illustrated.

Alternatively, in touch trigger mode the data collected from the probe and from the NC can be manipulated to give an apparent touch trigger operation e.g. by employing an algorithm which extrapolates data back to a notional zero point, allowing improved repeatability.

The synchronisation signal 24 is illustrated as originating at the NC. However the signal could come from another source, e.g. from the interface, programmable logic control, a scale reading system or a drive system. Thus it is possible that the NC would await the synchronisation signal and produce position data related to the time at which the signal occurs. The interface would do the same or may issue a synchronisation signal when it records measurement device data, e.g. at every tenth recording of data.

Alternatively the probe could have a clock, data issuing from the clock acting as a synchronisation signal to initiate a data recording of the machine's position. If both the probe and either the interface or machine tool controller have a clock then the clocks can be kept in lock by occasional linking signals. Data from a master source can be given the correct real time.

If real time identification of the data set of the probe and the data set of the position data from the machine tool is performed then the real time at which the two data sets is collected need not be the same. It would be possible to interpolate one set of data with respect to the other so that one or both sets of data are manipulated to arrive at an approximation of the data that would be expected if the two data sets were recorded at the same time.

In refinements of the invention it is possible to filter probe data prior to their combination with position data. This might be done when more probe data is collected than is required and the data can be averaged to eliminate vibration errors. More probe data can be produced by multiplying the synchronisation signal at the interface 60 and calling for data more often than the synchronisation signal occurrences.

In an alternative arrangement the synchronisation signal is not used to call for data from the probe, but is used to pick out data from a stream of data arriving at the interface 60.

If a fixed time delay is used and added to one set of data, then corrections for processing delays can be accommodated.

In practice the data stored in the second set may be data which has had machine errors e.g. due to thermal growth, corrected by separate software used in the NC, or other machine part.

The system described above allows collection of data from a probe and machine position data in a way which allows its later combination. Present NC controllers do not allow real time external access to machine position data and this system overcomes this problem.

The invention claimed is:

1. A workpiece inspection system comprising a machine tool which has a controller operable to perform a workpiece producing process and a workpiece inspection process on a workpiece, the workpiece inspection process being performed while a workpiece measurement device is mounted on the machine tool, the system operable to perform the steps of:
    changing a position of the workpiece relative to the workpiece measurement device;
    issuing time-based synchronisation signals defining a plurality of instants;
    causing measurements of the workpiece to be recorded, the inspection system comprising:
        a first system recording a first data set comprising varying data representing a position of the workpiece measurement device; and
        a second system, independent to the first system, recording a second data set from the workpiece measurement device comprising varying measurement data concerning the workpiece as detected and output by the workpiece measurement device,
        wherein the time-based synchronisation signals are used by the first and second systems in the recording of the first and second data sets such that simultaneous measurement device position and workpiece measurement device measurement data can be determined and subsequently combined; and
    combining data from the first and second data sets based on the synchronisation signals so as to obtain at least one instance of simultaneous measurement device position and workpiece measurement device measurement data so as to obtain a measurement at a location on the workpiece,
    wherein, subsequent to said recording of the measurements of the workpiece, the measurement obtained from the combined data is used to refine the workpiece producing process and the refined workpiece producing process is then performed.

2. A workpiece inspection system as claimed in claim 1 wherein the synchronisation signals issue from the controller.

3. A workpiece inspection system as claimed in claim 1 in which the synchronisation signals are used to label at least some of the recorded measurement device position data and/or workpiece measurement device measurement data in the first and second data sets such that simultaneous measurement device position data and workpiece measurement device measurement data can be determined and subsequently combined.

4. A workpiece inspection system as claimed in claim 1 wherein the measurement device is monitored at intervals which are more frequent than the occurrences of the said instants and only selected data is recorded to the second set and/or the data is manipulated prior to its recording.

5. A workpiece inspection system as claimed in claim 1 wherein the system further includes an interface circuit which accepts the synchronisation signals and the varying data from the workpiece measurement device.

6. A workpiece inspection system as claimed in claim 1 wherein the system includes a stop signal path from the workpiece measurement device to a machine controller and the machine controller can be configured to stop the workpiece measurement device if a stop signal is received by the machine controller.

7. A workpiece inspection system as claimed in claim 1 wherein the measurement device is a contact type dimensional measurement probe and the varying data relates to changes in the deflection of a workpiece contact stylus connected to the probe.

8. A workpiece inspection system as claimed in claim 1 wherein the first set of data is corrected to at least reduce positional errors of the machine tool, prior to combination with the second set.

9. A workpiece inspection system as claimed in claim 1 wherein the first and/or second sets of data are manipulated such that the manipulated data represents approximately the data which would have been obtained had the elements of two sets been recorded simultaneously.

10. A workpiece inspection system as claimed in claim 1 wherein the controller issues a further signal which enables the recording of the second set.

11. A workpiece inspection system as claimed in claim 1, wherein the second data set includes varying measurement data concerning the workpiece as detected from the workpiece measurement device.

12. A workpiece inspection system as claimed in claim 1, wherein the second data set represents deflection of the workpiece measurement device.

13. A workpiece inspection system as claimed in claim 1, wherein the first data set represents 3-dimensional position of the workpiece measurement device, and the second data set represents deflection of the workpiece measurement device.

14. A workpiece inspection system as claimed in claim 13, wherein the system generates a combined data set that includes a time-series of the deflection and a time series of the 3-dimensional position, the time series of the 3-dimensional position being combined and synchronized with the time series of the deflection.

15. A workpiece inspection system comprising a machine tool having a first part, a second part movable relative to the first part, and a controller operable to perform both a workpiece production process and a workpiece inspection process on a workpiece and for producing varying data representing a relative position of the first and second parts, the system also comprising a workpiece measurement device attached to the second part for producing varying measurement data and a synchronisation signal producer, the system operable to perform the following workpiece inspection steps:
    changing a position of the workpiece relative to the workpiece measurement device;
    issuing time-based synchronisation signals defining a plurality of instants;
    causing measurements of the workpiece to be recorded, the inspection system comprising:
        a first system recording a first data set comprising varying machine position data representing a position of the workpiece measurement device mounted on the second part;
        a second system, independent to the first system, recording a second data set from the workpiece measurement device comprising varying workpiece measurement device measurement data concerning the workpiece as detected and output by the workpiece measurement device, wherein the time-based synchronisation signals are used by the first and second systems in the recording of the first and second data sets such that simultaneous machine position data and workpiece measurement device measurement data can be determined and subsequently combined; and combining data from the first and second data sets based on the synchronisation signals so as to obtain at least one instance of simultaneous measurement device position and workpiece measurement device measurement data so as to obtain a measurement at a location on the workpiece, wherein, subsequent to said recording of the measurements of the workpiece, the measurement obtained from the combined data is used to refine the workpiece producing process and the refined workpiece producing process is then performed.

16. A workpiece inspection system as claimed in claim 15, wherein the system further includes software for influencing the workpiece producing process performed at the controller of the machine tool on the basis of the combined data.

17. A computer-readable storage medium having computer-executable instructions embedded thereon for controlling a workpiece inspection system, the system comprising a machine tool which has a controller operable to perform a workpiece producing process and a workpiece inspection process on a workpiece, the workpiece inspection process being performed while a workpiece measurement device is mounted on the machine tool, the instructions instructing the system to perform the steps of:

changing a position of the workpiece relative to the workpiece measurement device;

issuing time-based synchronisation signals defining a plurality of instants;

causing measurements of the workpiece to be recorded by:
  causing a first system of the inspection system to record a first data set comprising varying data representing a position of the workpiece measurement device; and
  causing a second system of the inspection system, independent to the first system, to record a second data set from the workpiece measurement device comprising varying measurement data concerning the workpiece as detected and output by the workpiece measurement device, wherein the time-based synchronisation signals are used by the first and second systems in the recording of the first and second data sets such that simultaneous measurement device position and workpiece measurement device measurement data can be determined and subsequently combined; and combining data from the first and second data sets based on the synchronisation signals so as to obtain at least one instance of simultaneous measurement device position and workpiece measurement device measurement data so as to obtain a measurement at a location on the workpiece, wherein, subsequent to said recording of the measurements of the workpiece, the measurement obtained from the combined data is used to refine the workpiece producing process and the refined workpiece producing process is then performed.

* * * * *